Patented July 21, 1936

2,047,978

UNITED STATES PATENT OFFICE 2,047,978

DECALCOMANIA PAPER

John MacLaurin, Ware, Mass.

No Drawing. Application April 5, 1935,
Serial No. 14,919

8 Claims. (Cl. 91—68)

This invention relates to decalcomania papers. In connection with the application of decalcomanias to certain articles of work having peculiar surface characteristics, a serious difficulty arises in producing a bond to such surfaces which will have the necessary strength and permanence. For example, this problem arises in connection with the application of decalcomanias to aluminum ware, surfaces coated with certain lacquers and other finishes, wrappers made of moisture-proof "Cellophane", and the like. Decalcomania coatings do not bond securely to these surfaces. In fact, the ordinary glues and adhesives are also open to the same objection.

A further difficulty encountered in the manufacture of products of this character is that of producing the desired smoothness in the decalcomania coatings. This is extremely important because of the fact that the decalcomania design is printed directly on the outer coat. A typical decalcomania paper includes two coats, an inner coat bonded directly to the backing sheet, and an outer coat superposed upon and bonded to the first coat. It is a common practice to make the first coat of starch, the viscosity of the coating material being relatively high so as to prevent any substantial penetration of the adhesive into the waterleaf backing sheet. The outer coating commonly consists chiefly, or exclusively, of dextrine. While the latter can be applied with the desired degree of smoothness, the former presents a good deal of difficulty.

The present invention deals with both problems above described and aims to devise a thoroughly practical solution for them.

As a result of a long period of research, I have found that by using suitable proportions of any of the soluble alkali salts of alginic acid in the coating compounds, both of the difficulties above described can be overcome. Because of considerations of expense, I prefer to use either ammonium alginate or sodium alginate, the latter having some advantages over the former. The proportions of this constituent used in either of the decalcomania coats can be varied widely, improved results being produced with proportions of anywhere between 5% and 50% of the dry weight of the coating materials. For most purposes a proportion about midway between these limits is entirely satisfactory.

When one of these alginates, in porportions such as those above mentioned, is mixed with the starch of the first coating, it greatly improves the spreading properties of the composition, and produces a more uniform and flexible film, while still permitting the use of coating materials in such consistencies that no substantial penetration of the first coat into the backing sheet takes place. In fact, a rather better control of the degree of penetration is obtained when an alginate is used than without it. In the outer coat the chief advantage of the alginate is in improving the adhesive properties of the coating composition. A better bond is produced with the work, particularly in applying decalcomanias to those articles having unusual surface characteristics, such for example, as those above mentioned. The coating also seems to retain its adhesive or bonding properties indefinitely. Consequently, the use of this constituent effectively solves both of the problems above described.

I have also found it entirely feasible to use a solution of one of these alginates, such for example, as sodium alginate, in place of the inner or first coating. In other words, the first coating operation can be made with a solution of, say, 5% of sodium alginate. However, considerations of cost usually make it preferable to use some other constituent, such as starch, in the first coating.

Having thus described my invention, what I desire to claim as new is:

1. A decalcomania paper comprising a suitable backing sheet and two superposed coatings of decalcomania adhesive on one side of said sheet, one of said coatings including a water soluble salt of alginic acid.

2. A decalcomania paper comprising a suitable backing sheet and two superposed coatings of decalcomania adhesive on one side of said sheet, the inner of said coatings including a water soluble salt of alginic acid.

3. A decalcomania paper comprising a suitable backing sheet and two superposed coatings of decalcomania adhesive on one side of said sheet, the inner of said coatings consisting essentially of a water soluble salt of alginic acid.

4. A decalcomania paper comprising a suitable backing sheet and two superposed coatings of decalcomania adhesive on one side of said sheet, the inner of said coatings consisting chiefly of starch and a water soluble alkali salt of alginic acid.

5. A decalcomania paper comprising a suitable backing sheet and two superposed coatings of decalcomania adhesive on one side of said sheet, the outer of said coatings including a water soluble salt of alginic acid.

6. A decalcomania paper comprising a suitable backing sheet and two superposed coatings of decalcomania adhesive on one side of said sheet, the outer of said coatings consisting chiefly of dextrine and a water soluble alkali salt of alginic acid.

7. A decalcomania paper comprising a suitable backing sheet and two superposed coatings of decalcomania adhesive on one side of said sheet, both of said coatings including a water soluble salt of alginic acid.

8. A decalcomania paper comprising a suitable backing sheet and two superposed coatings of decalcomania adhesive on one side of said sheet, the inner of said coatings consisting chiefly of starch and a salt of alginic acid, and the outer coating consisting chiefly of dextrine and a water soluble salt of alginic acid.

JOHN MacLAURIN.